3,096,159
METHOD OF MAKING A SINTERED CERAMIC ARTICLE

Harrison C. Van Cott, Horseheads, N.Y., assignor to Corning Glass Works, Corning, N.Y., a corporation of New York
No Drawing. Filed Jan. 2, 1962, Ser. No. 163,898
5 Claims. (Cl. 25—157)

This invention relates to a method of making ceramic articles having substantial mechanical strength and properties promoting resistance to thermal shock.

It is the primary object of this invention to provide a method of making sintered ceramic articles which have good thermal shock resistance and small coefficients of thermal expansion, which are capable of withstanding high temperatures, and in which very little if any shrinkage occurs in the preparation thereof.

In certain applications for ceramic articles, such as parts of heat regenerators, good thermal shock resistance and a small coefficient of thermal expansion are essential. These characteristics are needed in apparatus where rapid thermal changes occur. Materials are available by which ceramic articles having good thermal shock resistance can be prepared. However, in the preparation of ceramic shapes from these materials excessive shrinkage occurs.

Substantial shrinkage in large articles of such materials cause distortion or warping because the outside of the article heats up more rapidly than the inside during firing procedures. Furthermore, fractures may occur in any part of the structure, due to the high stresses formed by the differential shrinkage caused by non-uniform temperatures within the structures.

As further disadvantages, substantial shrinkage requires allowance for oversized dimensions, and requires considerable machining time and care to dimension the resulting article properly.

It has now been discovered that ceramic articles can be prepared while experiencing little if any substantial shrinkage during the firing thereof and yet result in a product of substantial mechanical strength and properties promoting resistance to thermal shock. These advantages are attained in accordance with this invention primarily by using as the batch composition from which a sintered ceramic article is to be produced a novel and critical composition consisting essentially of petalite and beta spodumene as hereinafter specified. By beta spodumene, I mean that form of spodumene that is produced upon calcination of alpha spodumene, natural or synthetic, at a temperature above its crystalline inversion temperature, e.g. 1100° C., or that is otherwise produced. Experience indicates that spodumene inversion is not rapid below about 1000° C. By petalite I mean to include natural petalite and synthetic petalite.

In accordance with the present invention a ceramic batch composition is formed that consists essentially, by weight, of 20 to 80 percent of beta spodumene and 80 to 20 percent of petalite. The ceramic article in the desired shape is then formed from the ceramic composition by any one of several conventional techniques, for example, by dry pressing the batch containing a binder, by extrusion, by slip casting, or by coating on a carrier which is then shaped in the manner disclosed in the co-pending application of R. Z. Hollenbach, Serial Number 759,706, filed September 8, 1958. Thereafter, the formed article is subjected to a firing schedule that includes sintering at a suitable temperature below the incipient melting point of the article.

Natural alpha spodumene is commercially available, but it is essential that it be inverted to the beta form prior to use in a batch in accordance with this invention. The inversion of alpha spodumene to the beta form is accompanied by great expansion, which could disrupt a formed article. On the other hand, batches made of petalite alone are subject to excessive shrinkage during firing and therefore are unsatisfactory.

For use in this invention, the alpha spodumene is first calcined at a temperature such as to cause inversion to the beta form, e.g. 1100° C. The resulting calcine is then ball milled into finely divided particles. The batch is prepared by mixing the calcine with petalite, which is also preferably finely divided, within the proportions set forth above. The resulting mixture suitably is further ball milled to insure homogeneity.

For some shaping techniques it is desirable to include in the batch a conventional binder for ceramic materials, and preferably a combustible or volatilizable binder. A wide variety of ceramic binders suited to the invention are known in the art. The choice of such materials is within the skill of the art. Particularly satisfactory results have been had with such conventional binders as polyethylene glycols, e.g. Carbowax #6000, and similar materials. The binder is thoroughly mixed with the ceramic materials, and the article is then shaped.

The shaped article is fired to sinter it to a strong and coherent state. Where a binder is used, the article is first heated to an intermediate temperature sufficient to burn out or volatilize the binder, for example, about 250° to 450° C., the preferred temperature being dependent on the nature of the binder used. Thereafter, the temperature of the article is raised slowly or at a moderate rate to levels where sintering can take place, e.g. 1300° to 1350° C., and held there for several hours, or until the article has been well sintered. The duration of firing is dependent on such factors as the temperature and the size of the article. It can suitably range between a few minutes and 10 or more hours. Marked overshrinkage does not take place with long firing.

In this manner, the process results in articles in which linear firing shrinkage does not exceed about 5 percent. With the preferred petalite-and-beta spodumene compositions, that is 25 to 60 weight percent of beta spodumene and the remainder petalite, the shrinkage can be markedly less than 5 percent. With such small changes in the article, fracturing, warpage and the like are minimal or non-existent, and any machining required is within that normally practiced to finish a given article. Moreover, the resulting articles are characterized by good strength and thermal shock resistance and small coefficients of thermal expansion.

The invention will be described further in conjunction with the following specific examples in which the details are given by way of illustration and not by way of limitation.

Ceramic-grade, natural alpha spodumene is first calcined for about five hours at 1100° C. This inverts the alpha spodumene to beta spodumene and is accompanied by considerable expansion and decrepitation. The calcined spodumene is dry milled for two hours, or until it passes through a 325 mesh screen (Tyler). The milled spodumene and finely divided natural petalite, in the proportions for the particular batch and in amounts to make a 500 gram batch, are then mixed for five hours in the mill along with about 500 ml. of acetone. The mixed batch is spread out and oven-dried. Then 15 grams of Carbowax #6000 and 1200 ml. of acetone are stirred into the batch. Carbowax #6000 is a hard, waxy solid polyethylene glycol sold by the Union Carbide Corporation. It has a freezing range of 58° to 62° C., a flash point above 450° F., a Saybolt viscosity at 210° F. of 6000 to 7500 seconds, and is water soluble as well as soluble in a wide range of organic solvents, e.g. aromatic hydrocarbons. Then the batch is dried sufficiently that the particles form granules during subsequent screening. It is then screened through a 10 mesh screen (Tyler), and further dried.

The resulting granules are then dry pressed at 5000 p.s.i. into three-inch bars that are about 0.25 to 0.30 inch thick and about 0.45 to 0.50 inch wide. The bars are placed on zircon firing setters having coarse zircon grain thereon as a parting agent. With the furnace set for 300° C. the bars are held for about ½ to 1 hour to burn out the binder. The furnace setting is moved to 1300° C., a temperature reached in about 3½ to 4 hours after the burn out of the binder. This temperature is held for about two hours. The bars are then raised to 1325° C. and the temperature is held another 2 hours. Then it is raised quickly again to 1350° C. and held for 3 hours. Bars are removed from the furnace at various times and the properties determined.

Ten sets of bars made from batches according to the invention were tested. All were made with the procedure just stated. The data obtained are:

Table

| Batch No. | Wt. percent | | Cumulative Firing Time, Hrs. | Firing Temp., °C. | Fired Bulk Density, gm./cc. | Transverse Strength, p.s.i. | Linear Shrinkage, percent |
|---|---|---|---|---|---|---|---|
| | Beta Spodumene | Petalite | | | | | |
| 1 | 80 | 20 | 0 | 1,300 | 1.36 | 2,126 | 1.5 |
| | | | 1 | 1,300 | | 3,593 | 2.0 |
| | | | 2 | 1,300 | 1.44 | 4,443 | 2.1 |
| | | | 3 | 1,325 | | 5,435 | 2.5 |
| | | | 4 | 1,325 | 1.42 | 5,427 | 2.6 |
| | | | 5 | 1,350 | | | 3.4 |
| | | | 6 | 1,350 | 1.58 | 4,613 | 4.3 |
| | | | 7 | 1,350 | 1.62 | 4,150 | 4.8 |
| | | | | 1,350 | | 2,932 | 4.9 |
| 2 | 70 | 30 | 0 | 1,300 | 1.38 | 2,415 | 1.4 |
| | | | 1 | 1,300 | | 3,385 | 1.7 |
| | | | 2 | 1,300 | 1.49 | 3,565 | 1.8 |
| | | | 3 | 1,325 | | 3,995 | 2.1 |
| | | | 4 | 1,325 | 1.44 | 4,809 | 2.4 |
| | | | 5 | 1,350 | | 4,576 | 2.8 |
| | | | 6 | 1,350 | | 4,217 | 3.3 |
| | | | 7 | 1,350 | 1.55 | 4,228 | 3.5 |
| | | | | 1,350 | 1.56 | 3,353 | 3.7 |
| 3 | 60 | 40 | 0 | 1,300 | 1.37 | 1,771 | 1.0 |
| | | | 1 | 1,300 | | 3,494 | 1.4 |
| | | | 2 | 1,300 | 1.47 | 2,978 | 1.4 |
| | | | 3 | 1,325 | | 4,168 | 1.6 |
| | | | 4 | 1,325 | 1.46 | 4,192 | 1.7 |
| | | | 5 | 1,350 | | 4,836 | 2.1 |
| | | | 6 | 1,350 | | 3,866 | 2.7 |
| | | | 7 | 1,350 | 1.52 | 3,343 | 2.9 |
| | | | | 1,350 | 1.57 | 3,474 | 3.0 |
| 4 | 50 | 50 | 0 | 1,300 | 1.39 | 2,129 | 0.8 |
| | | | 1 | 1,300 | | 3,206 | 1.4 |
| | | | 2 | 1,300 | 1.49 | 3,758 | 1.4 |
| | | | 3 | 1,325 | | 3,520 | 1.6 |
| | | | 4 | 1,325 | 1.46 | 4,210 | 1.8 |
| | | | 5 | 1,350 | | 4,176 | 2.1 |
| | | | 6 | 1,350 | | 4,045 | 2.3 |
| | | | 7 | 1,350 | 1.50 | 3,408 | 2.5 |
| | | | | 1,350 | 1.55 | 4,168 | 2.5 |
| 5 | 40 | 60 | 0 | 1,300 | 1.39 | 2,319 | 0.7 |
| | | | 1 | 1,300 | | 3,536 | 1.5 |
| | | | 2 | 1,300 | 1.52 | 3,474 | 1.6 |
| | | | 3 | 1,325 | | 4,033 | 1.8 |
| | | | 4 | 1,325 | 1.50 | 3,657 | 2.0 |
| | | | 5 | 1,350 | | 3,657 | 2.4 |
| | | | 6 | 1,350 | | 4,192 | 2.6 |
| | | | 7 | 1,350 | 1.57 | 3,883 | 2.6 |
| | | | | 1,350 | 1.49 | 4,113 | 2.6 |
| 6 | 35 | 65 | 0 | 1,300 | 1.42 | 1,452 | 0.4 |
| | | | 1 | 1,300 | | 2,155 | 1.2 |
| | | | 2 | 1,300 | 1.56 | 3,025 | 1.4 |
| | | | 3 | 1,325 | | 3,300 | 1.8 |
| | | | 4 | 1,325 | | 3,080 | 1.9 |
| | | | 5 | 1,350 | | 3,000 | 2.2 |
| | | | 6 | 1,350 | | 3,072 | 2.3 |
| | | | 7 | 1,350 | 1.59 | 3,511 | 2.4 |
| | | | | 1,350 | 1.50 | 3,743 | 2.4 |
| 7 | 30 | 70 | 0 | 1,300 | 1.42 | 1,539 | 0.1 |
| | | | 1 | 1,300 | | 3,213 | 0.8 |
| | | | 2 | 1,300 | 1.54 | 3,713 | 1.1 |
| | | | 3 | 1,325 | | 4,125 | 1.4 |
| | | | 4 | 1,325 | 1.60 | 4,714 | 1.6 |
| | | | 5 | 1,350 | | 3,600 | 1.9 |
| | | | 6 | 1,350 | | 3,387 | 2.2 |
| | | | 7 | 1,350 | 1.62 | 3,342 | 2.4 |
| | | | | 1,350 | 1.52 | 4,569 | 2.3 |
| 8 | 28 | 72 | 0 | 1,300 | 1.52 | 2,602 | 0.6 |
| | | | 1 | 1,300 | 1.59 | 3,988 | 1.4 |
| | | | 2 | 1,300 | 1.60 | 4,017 | 1.4 |
| | | | 3 | 1,325 | 1.61 | 4,696 | 2.1 |
| | | | 4 | 1,325 | 1.63 | 5,186 | 2.4 |
| | | | 5 | 1,350 | 1.67 | 4,522 | 2.9 |
| | | | 6 | 1,350 | 1.66 | 5,131 | 3.3 |
| | | | 7 | 1,350 | 1.66 | 5,400 | 3.4 |
| | | | | 1,350 | 1.58 | 5,322 | 3.5 |

| Batch No. | Wt. percent Beta Spodumene | Wt. percent Petalite | Cumulative Firing Time, Hrs. | Firing Temp., °C | Fired Bulk Density, gm./cc. | Transverse Strength, p.s.i. | Linear Shrinkage, percent |
|---|---|---|---|---|---|---|---|
| 9 | 25 | 75 | 0 | 1,300 | 1.44 | 2,247 | 0.2 |
|   |    |    | 1 | 1,300 |      | 3,600 | 0.9 |
|   |    |    | 2 | 1,300 | 1.56 | 3,991 | 1.0 |
|   |    |    | 3 | 1,325 |      | 4,990 | 1.7 |
|   |    |    | 4 | 1,325 | 1.56 | 4,400 | 2.1 |
|   |    |    | 5 | 1,350 |      | 4,714 | 2.6 |
|   |    |    | 6 | 1,350 |      | 4,671 | 3.1 |
|   |    |    | 7 | 1,350 | 1.66 | 4,828 | 3.2 |
|   |    |    |   | 1,350 | 1.58 | 5,108 | 3.2 |
| 10 | 20 | 80 | 0 | 1,300 | 1.42 | 2,063 | 0.4 |
|    |    |    | 1 | 1,300 |      | 2,916 | 1.4 |
|    |    |    | 2 | 1,300 | 1.53 | 3,630 | 1.6 |
|    |    |    | 3 | 1,325 |      | 5,421 | 2.9 |
|    |    |    | 4 | 1,325 | 1.57 | 4,164 | 3.0 |
|    |    |    | 5 | 1,350 |      | 5,956 | 3.6 |
|    |    |    | 6 | 1,350 |      | 5,791 | 4.5 |
|    |    |    | 7 | 1,350 | 1.70 | 6,043 | 4.9 |
|    |    |    |   | 1,350 | 1.62 | 5,928 | 4.6 |

The data on the bars in the above table were obtained as follows: Linear firing shrinkages were found by measuring bars with micrometer calipers at room temperature, before and after firing. To find transverse strengths, bars were broken with the use of a two-inch span and a single knife edge. Bar densities (bulk densities or overall specific gravities) were computed from weights and volumes of dry bars in air, or fragments thereof ground to regular parallelepipeds. Every listed strength is either the strength of a single bar or the arithmetic mean of strengths of a plurality of bars.

In consideration of the data in the above table, it should be noted that firing time does not include any of the heating that occurred below 1300° C. Further, except for those samples where no firing times are included, all bars were withdrawn from the furnace and the properties determined after air cooling; for example, in batch No. 1, bars were removed from the furnace upon the temperature reaching 1300° C. as well as after one and two hours at that temperature. The data for the bottom line of each batch number in the table were obtained from bars that had been permitted to cool to room temperature in the furnace.

The data in the table demonstrate the limited, small shrinkage that occurs with this invention. The degree of shrinkage lessens as the pentalite concentration increases from its minimum of 20 percent to about 70 percent, with the shrinkage being 3 percent or less at petalite contents from 40 to 70 percent. The strength of the bars is uniformly satisfactory. Thus the lessened shrinkage is not obtained at the expense of the strength of the article.

The process has also been tested at other conditions of operation. For example, products from batch compositions of 28 percent of beta spodumene and 72 percent of petalite were fired at 1300° to 1350° C. over a period extending to 28 hours (time at 1300° C. or higher). Some batches were first subjected to different milling schedules ranging from 2 hours to 22 hours. Slip-cast articles also were made. No additional significant shrinkage occurred at the longer firing time, nor was any definite advantage found in the more severe milling periods or in the manner of forming. It is therefore preferred to use the shorter periods for each. However, other satisfactory schedules as well as forming methods, particle size gradations and the like can be chosen by one skilled in the ceramic arts without departing from the scope of this invention.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. A method of making a sintered ceramic article comprising forming to the desired shape a finely divided ceramic batch composition consisting essentially, by weight, of 20 to 80 percent of beta spodumene and the remainder petalite, and sintering the resulting article at an elevated temperature but below the incipient melting point of said article.

2. A method in accordance with claim 1 in which said beta spodumene is 25 to 60 percent of said batch and said petalite is 75 to 40 percent.

3. A method of making a sintered ceramic article comprising calcining alpha spodumene thereby converting it to beta spodumene, forming a batch of petalite and said beta spodumene consisting essentially, by weight, of 20 to 80 percent of said spodumene and 80 to 20 percent of said petalite, forming an article of the desired shape from said batch, and firing the resulting article at a sintering temperature but below the incipient melting point thereof until said ceramic article is sintered into a strong and coherent state.

4. A method in accordance with claim 3 in which a temporary binder is included in said batch, and said article is heated at a temperature of about 250° to 400° C. to burn out said binder before said article is sintered.

5. A method in accordance with claim 3 in which said batch contains 25 to 60 percent of beta spodumene and 75 to 40 percent of petalite.

References Cited in the file of this patent

UNITED STATES PATENTS

Re. 24,795    Hummel _____ Mar. 15, 1960
2,919,995    Landron _____ Jan. 5, 1960

OTHER REFERENCES

Roy et al.: Compositional and Stability Relationship Among the Lithium Aluminosilicates: Eucryptite, Spodumene and Petalite in J. Am. Cer. Soc. 33 (5), pp. 152–159, May 1960.